United States Patent
Lucas

(10) Patent No.: US 9,732,630 B2
(45) Date of Patent: Aug. 15, 2017

(54) OIL SCOOP AND SHAFT WITH AXIALLY-ORIENTED HOLE

(71) Applicant: United Technologies Corporation, Hartford, CT (US)

(72) Inventor: James L. Lucas, Hamden, CT (US)

(73) Assignee: United Technologies Corporation, Farmington, CT (US)

( * ) Notice: Subject to any disclaimer, the term of this patent is extended or adjusted under 35 U.S.C. 154(b) by 152 days.

(21) Appl. No.: 14/671,681

(22) Filed: Mar. 27, 2015

(65) Prior Publication Data

US 2016/0281537 A1   Sep. 29, 2016

(51) Int. Cl.
  F01D 25/18   (2006.01)
  F01D 25/16   (2006.01)

(52) U.S. Cl.
  CPC .......... *F01D 25/183* (2013.01); *F01D 25/16* (2013.01); *F01D 25/18* (2013.01); *F05D 2230/80* (2013.01)

(58) Field of Classification Search
  CPC ......... F01D 25/183; F01D 25/16; F01D 25/18
  USPC ...................................................... 184/6.11
  See application file for complete search history.

(56) References Cited

U.S. PATENT DOCUMENTS

| | | | |
|---|---|---|---|
| 3,074,688 A | 1/1963 | Muth | |
| 3,248,880 A * | 5/1966 | Hull, Jr. | F01D 25/18 184/6.11 |
| 3,635,312 A * | 1/1972 | Kaufman | F16N 7/18 184/11.1 |
| 3,744,861 A * | 7/1973 | Bouiller | F01D 25/18 384/471 |
| 3,796,283 A * | 3/1974 | Raby | F16N 7/18 184/11.2 |
| 3,915,521 A | 10/1975 | Young | |
| 4,453,784 A * | 6/1984 | Kildea | F01D 25/18 184/6.11 |
| 4,468,066 A | 8/1984 | Alcorta | |
| 4,648,485 A * | 3/1987 | Kovaleski | F01D 25/18 184/13.1 |
| 4,844,201 A | 7/1989 | Ackerman | |
| 4,932,501 A * | 6/1990 | Decker | F16C 33/6674 184/6.11 |
| 6,409,464 B1 * | 6/2002 | Fisher | F01D 25/16 384/475 |
| 7,070,333 B2 * | 7/2006 | Ito | F16C 33/6677 184/6.17 |
| 7,124,857 B2 | 10/2006 | Gekht | |
| 7,244,096 B2 | 7/2007 | Dins | |
| 7,484,893 B2 * | 2/2009 | Kitaoka | F16C 33/6674 384/473 |

(Continued)

OTHER PUBLICATIONS

Szabolcs Serflek, "F-15E.info Technology Pratt & Whitney F100-PW-2201229 Engine", downloaded from <http://www.f-15e.info/technology/engines/pw2/pw2.htm>, 2007.

*Primary Examiner* — Michael Riegelman
(74) *Attorney, Agent, or Firm* — O'Shea Getz P.C.

(57) ABSTRACT

Aspects of the disclosure are directed to a system associated with an engine of an aircraft. The system includes a shaft configured with at least one axially-oriented hole, and an oil scoop configured to receive oil and provide the oil to the shaft, wherein the oil scoop is manufactured independently from the shaft, and wherein the oil scoop includes at least one retention mechanism for coupling to the shaft after the at least one axially-oriented hole is created in the shaft.

12 Claims, 4 Drawing Sheets

(56) References Cited

U.S. PATENT DOCUMENTS

| | | | |
|---|---|---|---|
| 7,931,407 B2 | 4/2011 | Begin | |
| 8,464,835 B2 * | 6/2013 | Munson | F01D 25/16 |
| | | | 184/14 |
| 8,746,407 B2 * | 6/2014 | Rosca | F16N 7/16 |
| | | | 184/6.16 |
| 9,464,572 B2 * | 10/2016 | Cutrara | F02C 7/06 |
| 2003/0039421 A1 * | 2/2003 | Fisher | F01D 25/18 |
| | | | 384/462 |
| 2006/0213726 A1 * | 9/2006 | Gekht | F01D 25/16 |
| | | | 184/11.4 |
| 2008/0128212 A1 * | 6/2008 | Utzat | F16D 25/123 |
| | | | 184/11.4 |
| 2013/0283758 A1 | 10/2013 | Wotzak | |
| 2014/0241851 A1 | 8/2014 | Demitraszek | |
| 2016/0032769 A1 * | 2/2016 | Stutz | F01D 25/18 |
| | | | 464/7 |
| 2016/0131034 A1 * | 5/2016 | Chilton | F16N 7/363 |
| | | | 184/6.11 |
| 2016/0281527 A1 * | 9/2016 | Lucas | F01D 17/06 |
| 2016/0319830 A1 * | 11/2016 | Sheridan | F01M 11/02 |

* cited by examiner

OIL SCOOP AND SHAFT WITH AXIALLY-ORIENTED HOLE

STATEMENT REGARDING FEDERALLY SPONSORED RESEARCH OR DEVELOPMENT

This invention was made with government support under contract number W911W6-08-2-0001 awarded by the United States Army. The government has certain rights in the invention.

BACKGROUND

In connection with an aircraft, an oil circuit supplies oil to a number of bearings that are positioned at longitudinally spaced apart locations along one or more engine shafts. Bearing compartments enclose the bearing assemblies and maintain a volume of oil with an oil-air interface. Within the bearing compartments, oil is supplied under pressure and is sprayed at selected areas or diffused through bearing assemblies. The oil flow cools the bearing assemblies which develop heat under friction, lubricates the bearing assemblies, flushes out any foreign particles that develop and splashes within the bearing compartment to cool and lubricate internal surfaces before being withdrawn from the bearing compartment by, e.g., the vacuum of a scavenge pump.

Various oil circulation mechanisms are provided in flow communication with each bearing compartment to supply a continuous flow of oil to the bearing compartment and scavenge spent oil from an outlet of the bearing compartment. Oftentimes, oil is supplied to bearing compartment components, e.g., seals and bearings through a shaft mounted axial oil scoop.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system associated with an engine of an aircraft, comprising: a shaft configured with at least one axially-oriented hole, and an oil scoop configured to receive oil and provide the oil to the shaft, wherein the oil scoop is manufactured independently from the shaft, and wherein the oil scoop includes at least one retention mechanism for coupling to the shaft after the at least one axially-oriented hole is created in the shaft. In some embodiments, the at least one axially-oriented hole includes a plurality of axially-oriented holes. In some embodiments, the system further comprises: at least one oil jet configured to provide the oil to the oil scoop. In some embodiments, the system further comprises: a spline or other machined feature configured to convey the oil axially forward to at least one radially-oriented hole after the oil traverses the at least one axially-oriented hole. In some embodiments, the system further comprises: the at least one radially-oriented hole configured to convey the oil from the spline or other features on the inside of the shaft to at least one of a seal runner and a bearing. In some embodiments, the system further comprises: a seal runner coupled to the shaft configured to transfer heat to at least a portion of the oil. In some embodiments, the system further comprises: a bearing coupled to the shaft configured to transfer heat to at least a portion of the oil. In some embodiments, the at least one retention mechanism is configured to enable the oil scoop to be press fit onto the shaft. In some embodiments, the at least one retention mechanism comprises at least one of an interference fit, a forming of the oil scoop into a groove, an adhesive, a fastener, or a weld.

Aspects of the disclosure are directed to a method comprising: forming at least one axially-oriented hole in a shaft of an aircraft engine, creating a pilot diameter and a groove in the shaft, manufacturing an oil scoop, seating the oil scoop onto a shaft pilot diameter subsequent to the formation of the at least one axially-oriented hole in the shaft, and applying a technique to retain the oil scoop in the groove. In some embodiments, the applied technique comprises swaging. In some embodiments, the method further comprises: applying heat to the oil scoop. In some embodiments, the method further comprises: assembling a seal runner on the shaft. In some embodiments, the method further comprises: assembling a bearing onto the shaft. In some embodiments, the method further comprises: assembling a nut to clamp at least one of the seal runner or the bearing. In some embodiments, the method further comprises: assembling a sub assembly formed from the bearing, the nut, the seal runner, and the shaft into a bearing housing. In some embodiments, the method further comprises: assembling at least one oil jet into the bearing housing.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1A:
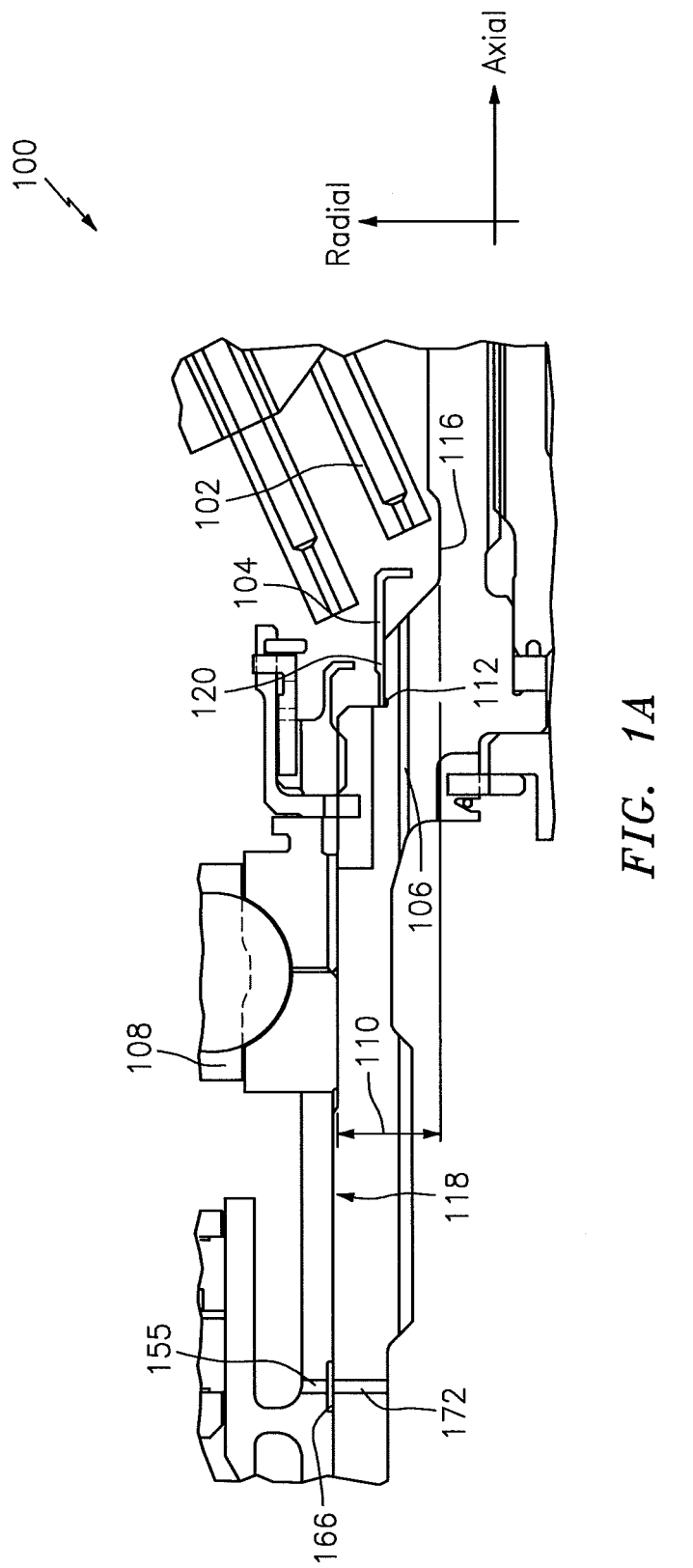
FIGS. 1A-1B illustrate an exemplary system for coupling an oil scoop and a shaft of an engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for providing an oil scoop (e.g., an axial oil scoop). In some embodiments, one or more oil holes (e.g., axially-oriented oil holes) are machined prior to an assembly of the oil scoop.

Figure 1B:
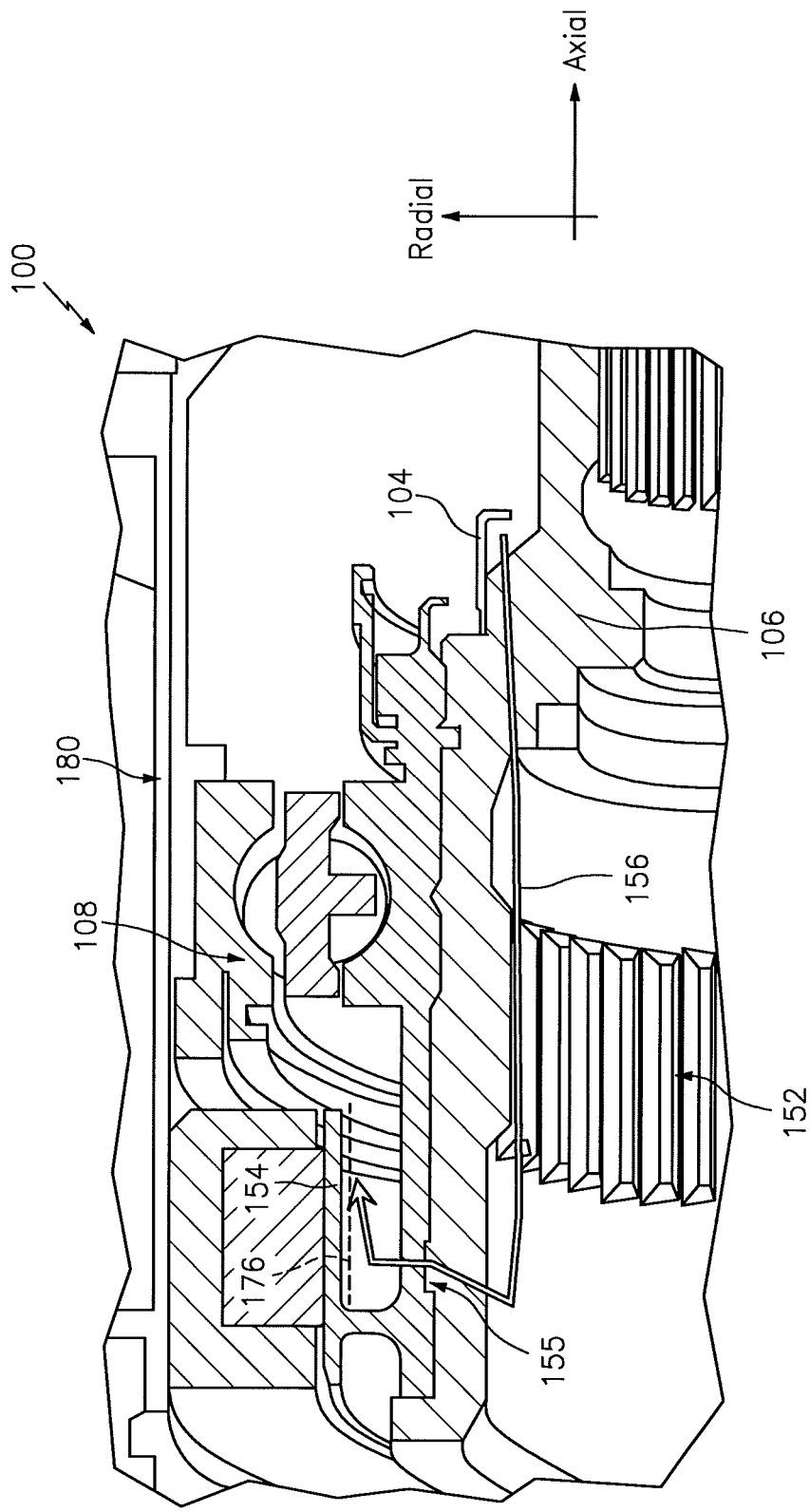

Aspects of the disclosure may be applied in connection with an engine of an aircraft, such as for example a multi-spool turboshaft engine associated with a helicopter. Furthermore, aspects of the disclosure may be applied in connection with an oil system of an engine. Referring to FIGS. 1A-1B, a portion of such an oil system is shown and is generally denoted by reference character 100.

Figure 3:
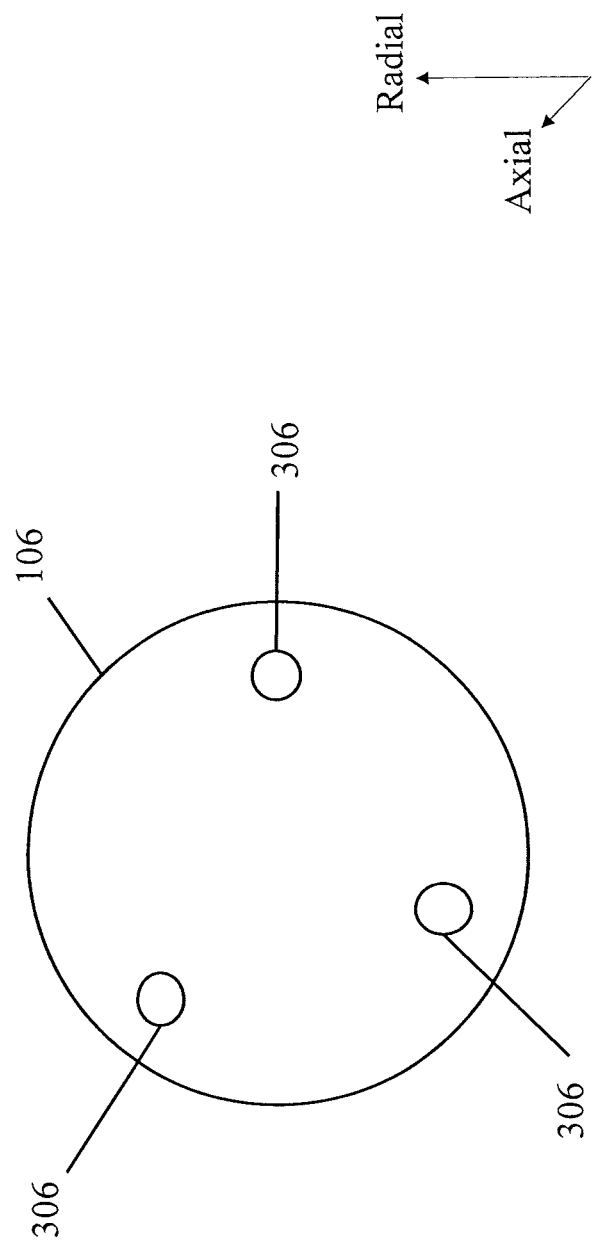
FIG. 3 illustrates a shaft including axially-oriented holes.

As shown in FIG. 1A, oil may be provided by an oil jet 102 to an oil scoop 104. The oil scoop 104 may cause the oil to be transferred via holes (e.g., axially-oriented holes 306—see FIG. 3) in a shaft 106 to one or more components or devices that consume the oil, such as for example a bearing 108. For reference purposes a radial space or clearance between the shaft 106 and the bearing 108 is identified in FIG. 1 via reference character 110. This radial space 110 may be relatively small. For example, the radial space 110 may be established or minimized based on balanced design goals of maximizing a shaft outer diameter 116 in order to carry torque while minimizing a bearing inner diameter 118 to reduce angular velocity which may be roughly proportional to bearing stress.

The oil scoop 104 may include a secondary retention mechanism 112. The secondary retention mechanism 112 may be associated with a piloting and sealing diameter 120 on the shaft 106, which may provide for an interference fit. The interference fit may serve as a primary retention mechanism with respect to the scoop 104.

The secondary retention mechanism 112 may be press fit onto the shaft 106 after the axial holes in the shaft 106 are created. In some embodiments, the secondary retention mechanism 112 may be subject to a forging (e.g., swaging) technique with respect to a groove formed in the shaft 106.

Referring to FIGS. 1A-1B, the oil may be conveyed from the oil scoop 104 via the shaft/shaft assembly 106 to a spline 152, such as for example a power turbine output spline. From the spline 152, the oil may be provided to the bearing 108 and/or a runner 154 (e.g., a carbon seal runner) via a groove 166 and one or more radially-oriented holes 155. There may be holes 172 through the shaft 106 that feed the groove 166. The bearing 108 and/or the runner 154 may consume at least a portion of the oil. An exemplary path that the oil follows is denoted in FIG. 1B via reference character 156.

Superimposed in FIG. 1B is a reference line 176. The reference line 176 provides an indication of a location where the oil cools the inside of the runner 154.

The components and devices described above in connection with FIGS. 1A-1B may be included within a housing 180, such as for example a bearing housing.

Some of the examples described above in connection with FIGS. 1A-1B related to a provisioning of oil via one or more axially-oriented holes in a shaft (e.g., shaft 106). In some embodiments, the shaft may be manufactured to include radially-oriented holes for receiving oil from one or more oil jets (e.g., oil jet 102).

While a single oil scoop 104 is shown in FIGS. 1A-1B, in some embodiments more than one oil scoop may be included. For example, multiple scoops may be used in a space-limited area to ensure that a sufficient quantity or volume of oil is delivered to components that consume the oil. As part of a design procedure, a size/dimension of an oil scoop may be determined. The size/dimension of the oil scoop may be based on one or more parameters, such as space that is available. For example, a consideration when trying to create a large scoop is the dynamics/structural/stress requirements. If the "flat plate" forming the aft side of the scoop gets too radially tall this may present a stiffness problem. A more conical structure might be required, but this conical structure may consume axial space. Tradeoffs may be made based on the particular application environment/context.

Figure 2:
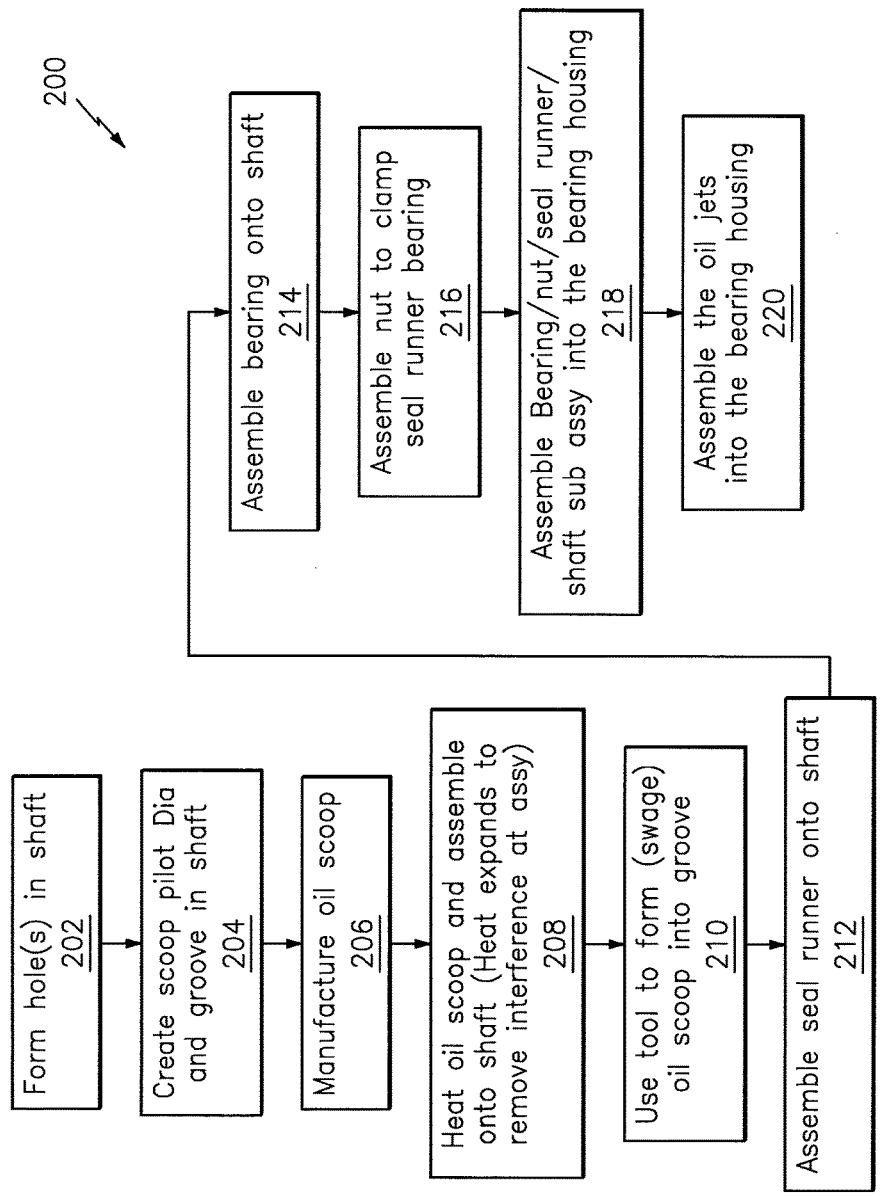
FIG. 2 illustrates an exemplary method for forming an oil system.

Referring now to FIG. 2, a flow chart of an exemplary method 200 is shown. The method 200 may be executed by, or in conjunction with, one or more systems, components, or devices, such as those described herein. For example, the method 200 may be executed in order to form a portion of an oil system, such as the oil system 100 described above.

In block 202, one or more holes may be formed in a shaft. The shaft may be configured to be used in conjunction with an engine of an aircraft. The holes may be configured to be aligned with an engine axis, which is to say that the holes may be axially-oriented.

In block 204, a pilot diameter (Dia) 120 for primary retention and a groove for secondary retention 112 may be created/manufactured on the shaft. The groove may be configured to receive/seat an oil scoop.

In block 206, the oil scoop may be manufactured (e.g., machined).

In block 208 the oil scoop may be heated and assembled onto the shaft. Application of the heat may be used to remove interference at assembly.

In block 210, one or more tools may be used to form (e.g., swage) the oil scoop into a groove (e.g., the groove of block 204).

As part of block 208 or block 210 (or potentially in lieu of one or both of blocks 208 and 210), one or more attachments techniques may be used. For example, welding may be used. In some embodiments, one or more fasteners (e.g., a threaded technique or application of an adhesive) may be used. One or more adhesives may be used.

In block 212, a seal runner may be assembled onto the shaft.

In block 214, a bearing may be assembled onto the shaft.

In block 216, a nut may be assembled to clamp the seal runner and/or the bearing.

In block 218, a sub assembly formed from, e.g., the bearing, nut, seal runner and shaft may be assembled into a bearing housing.

In block 220, one or more oil jets may be assembled into the bearing housing.

The blocks described above in connection with the method 200 are illustrative. In some embodiments, the blocks may execute in an order or sequence that is different from what is shown and described above. In some embodiments, one or more of the blocks (or a portion thereof) may be optional. In some embodiments, additional blocks not shown may be included.

In accordance with aspects of the disclosure, a spline may be lubricated and may direct oil to one or more holes (e.g., radially-oriented holes). In some embodiments, spline teeth may be included. A spline or other machined feature may be used to convey oil in one or more directions.

In some embodiments, oil may remove heat from one or more components (e.g., a seal runner, a bearing, a spline, etc.). The oil may be used to reduce friction as well as remove heat caused by any friction that is present.

Technical effects and benefits of the disclosure include a provisioning of an oil scoop as a separately/independently manufactured piece. The oil scoop may be press fit onto a shaft after axial holes used to convey oil are created. Such an arrangement may be particularly useful in engine environments where space (e.g., radial space between a bearing and the shaft) is limited.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

What is claimed is:

1. A bearing lubrication system comprising:
   a shaft including
   an inlet,
   at least one axially-oriented hole extending downstream from the inlet,
   at least one radially-oriented hole axially disposed downstream from the inlet, the at least one radially-oriented hole radially extending from a shaft exterior surface to the at least one axially-oriented hole, and
   an axially-oriented spline disposed on the shaft exterior surface;
   an oil scoop fluidly coupled to the shaft inlet so that the spline conveys oil axially downstream from the inlet to the at least one radially-oriented hole; and
   wherein the oil scoop is fixedly connected to the shaft.

2. The system of claim 1, wherein the at least one axially-oriented hole includes a plurality of axially-oriented holes.

3. The system of claim 1, further comprising:
   at least one oil jet configured to provide the oil to the oil scoop.

4. The system of claim 1, further comprising:
   the at least one radially-oriented hole configured to convey the oil from the spline to at least one of a seal runner and a bearing.

5. The system of claim 1, further comprising:
   a seal runner coupled to the shaft configured to transfer heat to at least a portion of the oil.

6. The system of claim 1, further comprising:
   a bearing coupled to the shaft configured to transfer heat to at least a portion of the oil.

7. The system of claim 1, wherein the oil scoop is fixedly connected to the shaft via a press fit onto the shaft.

8. The system of claim 1, wherein the oil scoop is fixedly connected to the shaft via at least one of an interference fit, a forming of the oil scoop into a groove, an adhesive, a fastener, or a weld.

9. The system of claim 1, wherein the oil scoop is fixedly connected to the shaft via at least one of an adhesive, a fastener, or a weld.

10. The system of claim 1, wherein the spline is configured to provide the oil to a bearing and a seal runner via a groove and the at least one radially-oriented hole.

11. The system of claim 10, wherein the spline is a power turbine output spline, and wherein the shaft includes a plurality of holes that feed the oil to the groove.

12. The system of claim 1, wherein the oil scoop is an axial oil scoop.

* * * * *